June 30, 1931.  M. CADÉ  1,812,772
NAIL POLISHER
Filed Aug. 8, 1930  2 Sheets-Sheet 1

Inventor:-
Marcel Cadé
by
Attys.

June 30, 1931.   M. CADÉ   1,812,772
NAIL POLISHER
Filed Aug. 8, 1930   2 Sheets-Sheet 2
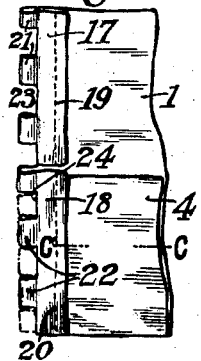
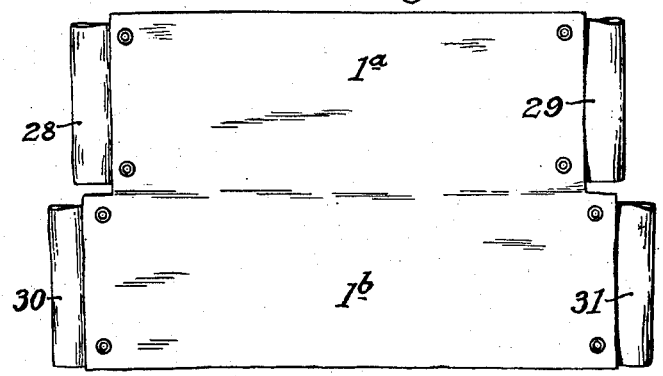
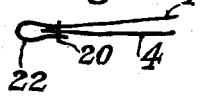
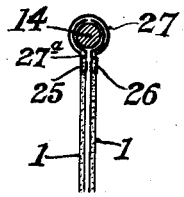
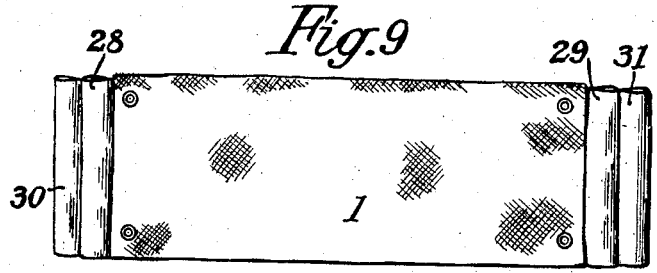
Inventor:-
Marcel Cadé
by Langner, Parry, Card & Langner
Attys.

Patented June 30, 1931

1,812,772

UNITED STATES PATENT OFFICE

MARCEL CADÉ, OF PARIS, FRANCE

NAIL POLISHER

Application filed August 8, 1930, Serial No. 474,021, and in France July 9, 1930.

Nail polishers usually consist in a skin applied on a suitable support and held under tension by its edges which are clamped between this support and a ring or guard which surrounds it.

In these polishers, the skin is apparent and rapidly becomes dirty; moreover, the support it covers is usually not sufficiently supple to allow it to take the shape of the nails and to rapidly polish them in an equitable manner. Finally, if it is desired to polish the nails first with a paste and then without any substance, two different polishers must be used, or two skins must be successively fitted on the support, this always being a delicate operation.

Moreover, the ring or guard which holds the skin is fragile and is the cause of numerous inconveniences.

The present invention has for an object a polisher of quite a new conception and adapted to avoid these inconveniences.

The polisher in accordance with the invention comprises a skin folded on itself so as to form a kind of small pocket; the face on which the nails rub is thus situated inside, and the nails are guided in their movement by the bottom of the pocket. This face is therefore normally concealed and does not become dirty. Moreover both halves of the skin thus folded can respectively serve for polishing with a paste and for dry polishing. A skin or any membrane can be interposed between these halves in order to avoid that the paste of the first one should come into contact with the the second one.

The skin, arranged as stated, is mounted on an armature or frame which holds it stretched, for instance by means of two rods to which its ends are secured. This armature is so arranged as to leave it a certain amount of "slack", in such a manner that it perfectly takes the shape of the nails and polishes the same throughout their surface. For that purpose, it suffices to engage the fingers one after the other in the pocket and to rub each nail entirely covered by the skin which moulds round the same.

This polisher is moreover flat which renders it stable, compact and easily placeable in a toilet case.

Finally, the skin can be easily removed and replaced in position, its mode of assemblage on the frame allowing to instantaneously remove it therefrom without risk of damaging fragile members, as in polishers actually in use.

Throughout the specification it must be understood that the word "skin" will preferably designate an outer leather which is practically inextensible and internally lined, by glueing, with a fine skin, such as chamois leather for instance.

The accompanying drawings illustrate, by way of example, some preferred forms of carrying out the subject-matter of the invention.

Figs. 1 to 3 relate to a first form of construction, and are, respectively:

Fig. 1 an elevation,

Fig. 2 a section made according to line A—A of Fig. 1,

Fig. 3 a section made according to line B—B of Fig. 1.

Figs. 4 to 6 illustrate by way of example, two forms of carrying out this arrangement.

Fig. 4 shows the skin unfolded.

Fig. 5 is a section made according to line C—C of Fig. 4.

Fig. 6 is a section of a modification of this form of carrying out the said arrangement.

Figure 1:
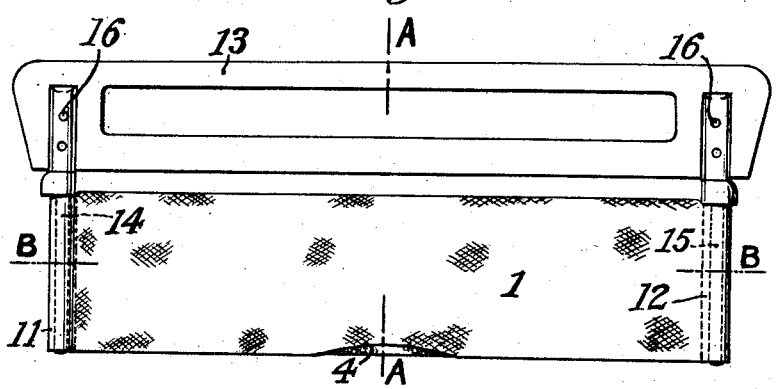
Figure 2:
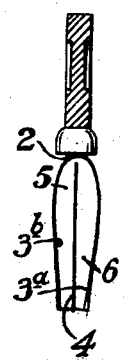
Figure 3:
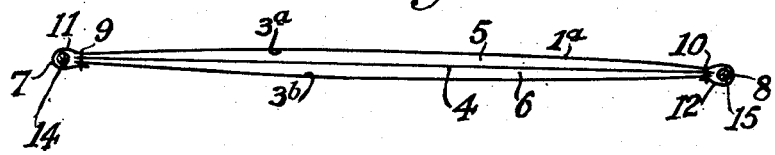
Figure 7:
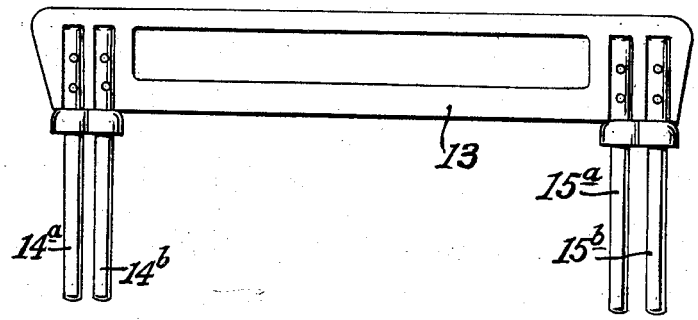

Figs. 7, 8 and 9 respectively illustrate the frame, the skin unfolded, and the skin folded and ready to be mounted on its frame, of a last form of carrying out the invention.

The skin 1 is folded on itself as shown at 2, and its inner face is used for polishing. Both halves 3a and 3b of this skin can be respectively used for polishing with a paste and for dry polishing; in this case, a thin skin 4 separates these halves and prevents that one of the latter serving for polishing with paste should come into contact with the second one by dividing the interior of the polisher 1 into two compartments 5, 6.

Both ends 7, 8 of one of the halves 3a of the skin 1 are folded and sewn at 9, 10 and thus form two sheaths 11, 12.

The seams 9, 10 serve at the same time to secure by their edges both halves of the skin 1, folded down one on the other, as well as the skin 4.

The polisher described above is mounted on a frame devised in the following manner:

A handle 13 carries at both ends two rods 14, 15 mounted on the same in any suitable manner. (They are for instance slotted at their end, and the handle 13, fitted in these slots, is secured therein by rivets 16).

These rods are threaded in both sheaths 11, 12 and thus hold the skin 1. The spacing apart of the rods 14, 15 is slightly smaller than that of their sheaths, so that the fingers can be easily introduced in one of the compartments 5, 6 and that the skin fits over the entire surface of the nails.

This method of securing the skin on the frame allows to place it in position and to remove it instantaneously.

The skin can be so arranged as to unfold when it is removed from the frame; this arrangement presents, in particular, the advantage of rendering the inside of skin easily accessible, for instance for introducing paste therein.

As shown in Figs. 4 and 5, the ends 17, 18 of both halves of the skin 1 are cut out, folded and sewn as shown at 19, 20, so as to form two sheaths similar to the sheaths 11, 12 above described. (The seams 20 serve at the same time to secure the skin 4).

These sheaths are constituted by series of rings 21, 22 separated by intervals 23, 24, owing to the cutting out operation above mentioned.

These rings are so arranged that, when the skin 1 is folded, the rings 21 are inserted, between the rings 22, in the interval 24 provided between them (their position is illustrated in dot and dash lines in Fig. 4), the rings 22 entering the intervals 23, so as to constitute a continuous sheath at each end of the polisher.

The rods 14, 15 of the frame are threaded in these sheaths and hold the skin in this position.

Alternately, instead of cutting out and folding the ends 17, 18, two metal mountings might be secured to these ends 17, 18, (for instance by clasping), these mountings being of the same arrangement and constituting a series of rings such as 21, 22 in which the rods 14, 15 would be threaded.

According to the modification shown in Fig. 6 each of the halves of the skin 1 is provided at both ends with metal fittings such as 25, 26, in the shape of hollow half cylinders which fit, when the skin is being folded, on the rods 14, 15 of the frame, and cover these rods.

These fittings are then held in position by tubes such as 27, slotted at 27a parallel to their generatrices and threaded on the rods 14, 15 and on the fittings 25, 26 over the outer profile of which they exactly fit.

According to the form of construction shown in Figs. 7 to 9, the skin 1 has four sheaths 28, 29, 30, 31, respectively provided at each of the ends of the halves 1a, 1b of this skin and so arranged that, when the skin is folded, the sheaths 28 and 30, on the one hand, and 29 and 31, on the other hand, are located side by side, respectively at each end of the skin.

The handle 13 carries two groups of rods 14a 14b and 15a 15b which are threaded in the four sheaths above mentioned and hold the skin in position. It is to be understood that the invention is not limited to the forms of construction described above solely by way of example, and that, without departing from the scope of the invention, the details of these forms of construction might be modified in any suitable manner. For instance, the two groups of two rods 14a 14b and 15a 15b might be replaced by two rods such as 14 and 15 slotted at their middle portion and other method of assemblage of the skin 1 on the rods of the handle 13 might be provided, or any stop devices immobilizing the skin on the said rods might be used; moreover, the different members, and particularly the handle might be given any other shape than that illustrated, and any decorative designs capable of being applied on the said handle might be provided, etc.

Claims:

1. In a polisher, the combination of a skin folded on itself so as to form a small pocket with a frame having a handle and two uprights on which can be secured the edges of the said pocket, the spacing apart of the said uprights being slightly smaller that the width of the pocket.

2. In a polisher, the combination of a skin folded on itself so as to form a small pocket, a membrane interposed between the two folded halves of the skin, and of a frame having a handle and two uprights on which can be secured the edges of the said pocket, the spacing apart of the uprights being slightly smaller than the width of the pocket.

3. In a polisher, the combination of a skin folded on itself so as to form a small pocket, with a frame having a handle and two uprights, both ends of one of the halves of the skin being folded and sewn on themselves and with the ends of the other half of the skin, and forming two sheaths which are threaded on said uprights, the spacing apart of the said uprights being slightly smaller than the width of the pocket.

4. In a polisher, the combination of a skin folded on itself so as to form a small pocket with a frame having a handle and four uprights, both ends of the halves of the skin being folded and sewn on themselves and forming four sheaths in which are threaded said uprights, the spacing apart of the said uprights being slightly smaller than the width of the pocket.

5. In a polisher, the combination of a skin folded on itself so as to form a small pocket, with a frame having a handle and two uprights slotted lengthwise, both ends of the halves of the skin being folded and sewn on themselves and forming four sheaths in which are threaded the four sections of said uprights, the spacing apart of the said uprights being slightly smaller than the width of the pocket.

6. In a polisher, the combination of a skin folded on itself so as to form a small pocket, with a frame having a handle and two uprights, both ends of the halves of the skin being folded and sewn on themselves and cut out so as to form two series of rings fitting between each other and which are threaded on said uprights, the spacing apart of the said uprights being slightly smaller than the width of the pocket.

7. In a polisher, the combination of a skin folded on itself so as to form a small pocket, with a frame having a handle and two uprights, the ends of each half of the skin being provided with metal fittings which are secured on said uprights, the spacing apart of the uprights being slightly smaller than the width of the pocket.

In testimony whereof I have hereunto affixed my signature.

MARCEL CADÉ.